US011858777B2

(12) United States Patent
Fauconnet et al.

(10) Patent No.: US 11,858,777 B2
(45) Date of Patent: Jan. 2, 2024

(54) ELEVATOR CAR WITH MOVING ELECTRICAL BOX

(71) Applicant: Otis Elevator Company, Farmington, CT (US)

(72) Inventors: Aurelien Fauconnet, Isdes (FR); Franck Rivoiret, Les Bordes (FR); Fabrice Boniface, Châtillon sur Loire (FR); Morgane Appourchaux, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/980,301

(22) Filed: Nov. 3, 2022

(65) Prior Publication Data

US 2023/0391587 A1 Dec. 7, 2023

(30) Foreign Application Priority Data

Jun. 3, 2022 (EP) .................................... 22305811

(51) Int. Cl.
*B66B 11/02* (2006.01)

(52) U.S. Cl.
CPC ................................ *B66B 11/0246* (2013.01)

(58) Field of Classification Search
CPC .................................................. B66B 11/0246
See application file for complete search history.

(56) References Cited

U.S. PATENT DOCUMENTS

| | | | | |
|---|---|---|---|---|
| 9,764,925 | B2 | 9/2017 | Cheng | |
| 10,227,213 | B2 * | 3/2019 | Fauconnet | B66B 11/0226 |
| 10,589,964 | B2 * | 3/2020 | Cortes | B66B 11/0226 |
| 11,078,043 | B2 | 8/2021 | Rocher et al. | |
| 2019/0135586 | A1 | 5/2019 | Haapaniemi et al. | |
| 2019/0248624 | A1 | 8/2019 | Romo et al. | |
| 2019/0330024 | A1 * | 10/2019 | Durand | B66B 11/0025 |
| 2022/0212895 | A1 * | 7/2022 | Guo | B66B 5/0087 |

FOREIGN PATENT DOCUMENTS

| | | | | |
|---|---|---|---|---|
| CN | 109476462 A | 3/2019 | | |
| CN | 109153533 B | 3/2021 | | |
| CN | 113321099 A | 8/2021 | | |
| EP | 1398290 A1 | 3/2004 | | |
| EP | 1604934 A1 | 12/2005 | | |
| EP | 2336071 A1 | 6/2011 | | |
| EP | 2190770 B1 | 11/2011 | | |
| EP | 2035315 B1 | 9/2012 | | |
| EP | 2496509 B1 | 1/2016 | | |
| EP | 3372544 A1 | * | 9/2018 | B66B 11/0206 |

(Continued)

OTHER PUBLICATIONS

European Search Report for application EP 22305811.6, dated Oct. 14, 2022, 9 pages.

*Primary Examiner* — Diem M Tran
(74) *Attorney, Agent, or Firm* — CANTOR COLBURN LLP

(57) ABSTRACT

An elevator car includes one or more sidewalls defining an interior space for accommodating passengers; and an electrical box (25) mounted to a sidewall by a mount (30). The mount (30) is arranged to allow the electrical box (25) to vertically translate between a first position and a second position relative to the sidewall.

14 Claims, 8 Drawing Sheets

(56) References Cited

FOREIGN PATENT DOCUMENTS

| | | | | | |
|---|---|---|---|---|---|
| EP | 3560878 | A1 | | 10/2019 | |
| EP | 3126278 | B1 | | 12/2019 | |
| EP | 3484807 | B1 | | 7/2020 | |
| EP | 3484803 | B1 | | 3/2021 | |
| EP | 3484806 | B1 | | 4/2021 | |
| EP | 1641699 | B1 | | 5/2021 | |
| EP | 3862309 | A1 | | 8/2021 | |
| EP | 3872020 | A1 | | 9/2021 | |
| EP | 3909897 | A1 | | 11/2021 | |
| JP | 4684021 | B2 | | 5/2011 | |
| WO | WO-2011054833 | A1 | * | 5/2011 | ......... B66B 11/0226 |
| WO | 2021121904 | A1 | | 6/2021 | |

* cited by examiner

ELEVATOR CAR WITH MOVING ELECTRICAL BOX

FOREIGN PRIORITY

This application claims priority to European Patent Application No. 22305811.6, filed Jun. 3, 2022, and all the benefits accruing therefrom under 35 U.S.C. § 119, the contents of which in its entirety are herein incorporated by reference.

TECHNICAL FIELD

This disclosure relates to an elevator car having an electrical box mounted thereon.

BACKGROUND

An elevator car may have various components mounted thereon, including one or more electrical boxes, that may require inspection from time to time.

It is known to provide working platforms located in or above the ceiling of elevator cars, which are moveable between a stowed position and a deployed position. In the deployed position, the working platform is located within the elevator car, at such a height that a maintenance person is able to stand on the working platform and access elevator components through an opening in the elevator car ceiling. Typically, such a working platform is suspended from at least one pair of suspension arms. EP3587333 A1 discloses a working platform that is moveably mounted to a support frame by at least one scissor mechanism. EP3943432 A1 discloses a working platform that is movable mounted to a support frame by an extendable suspension mechanism.

By utilising a foldable working platform, the overhead distance between the top of a hoistway and the roof of an elevator car may be reduced as a maintenance person may stand primarily within the interior of the elevator car and still access components above the ceiling of the elevator car. However, any components (such as electrical boxes and controls) on the top of an elevator car can limit the extent to which the overhead distance can be minimised.

SUMMARY OF INVENTION

According to a first aspect of this disclosure there is provided an elevator car comprising: one or more sidewalls defining an interior space for accommodating passengers; and an electrical box mounted to a sidewall of the one or more sidewalls by a mount, wherein the mount is arranged to allow the electrical box to vertically translate between a first position and a second position relative to the sidewall.

By mounting the electrical box on the elevator car sidewall, rather than on the roof of the elevator car, the overhead distance may be further minimised. Thus, during operation of the elevator car, the electrical box may be in a "low height" (i.e. the first) position. In such a position, the height to which the electrical box extends above the roof is minimised, thus allowing the overhead distance of the elevator car and system to be reduced. However, in such a position, the electrical box may be difficult to reach or inspect by a maintenance person. Thus, when the electrical box is required to be inspected by a maintenance person, it can be moved to an "extended" (i.e. the second) position above the elevator car to allow access thereto.

In some examples, the elevator car comprises a roof and the mount is arranged to allow the electrical box to vertically translate from the first position to a second position above the first position. In such examples, the electrical box at least partially extends above the roof at least in the second position. By at least partially extending above the roof in the second position, the maintenance person is able to access the components contained within the electrical box either from a position on the roof or from a platform (i.e. a landing or a foldable working platform) that allows access to the components on the roof.

In some examples, the roof comprises a support frame wherein a working platform is suspendably connected to the support frame and moveable between a stowed position, above the interior space, and an operational position, suspended within the interior space. In such examples, when the working platform is in the operational position, a maintenance person is able to stand on the working platform such that at least part of their body is within the interior space of the elevator car but they are still able to access elevator components on the roof through the opening in the elevator car ceiling (said opening being filled by the working platform when it is in the stowed position). This allows the overhead distance between the top of a hoistway and the roof to be reduced.

In some examples, when the electrical box is in the second position, 50% or more of the electrical box extends above the roof. In some examples, when the electrical box is in the second position, 50% or more of the total volume of the electrical box extends above the roof. In some examples, when the electrical box is in the second position, 50% or more of the total height of the electrical box extends above the roof (i.e. wherein the height is defined as the distance from the upper-most surface of the electrical box to the bottom-most surface of the electrical box in a direction parallel to the longitudinal axis of the hoistway, i.e. the axis of travel of the elevator car). For example, when the electrical box is in the second position, the distance from the top-most point of the box to the roof is greater than the distance from the bottom-most point of the box to the roof.

It will be appreciated that the top-most point of the electrical box may be defined as the part of the electrical box that would theoretically provide the first point of contact between the hoistway ceiling and the electrical box if the electrical box was moved (e.g. with the elevator car) in an upwardly direction, e.g. if the electrical box was not returned to the first position after being accessed by the maintenance person and the elevator car was operated normally. Similarly, the bottom-most point of the electrical box may be defined as the part of the electrical box which would theoretically provide the first point of contact between the hoistway floor and the electrical box if the electrical box was (theoretically) moved in a downwardly direction until contact with the hoistway floor was established. As such, the top- and bottom-most points may be defined by the position of wires or components that protrude from the electrical box.

In contrast, it will be appreciated that a box may be considered to have six surfaces that form a substantially cuboid shape. As such, the upper-most surface of the electrical box is defined as the upper or top surface of this cuboid (e.g. ignoring any components such as wires that may protrude above this surface), i.e. the surface of the cuboid electrical box which is parallel to and facing towards the hoistway ceiling. Similarly, the bottom-most surface of the electrical box is defined as the bottom surface of the cuboid (e.g. ignoring any components such as wires that may protrude below this surface), i.e. the surface of the cuboid electrical box which is parallel to and facing away from the hoistway ceiling and towards the hoistway floor. In some examples, the top-most point may be on the upper-most surface and/or the bottom-most point may be on the bottom-most surface. In some examples, the top-most point is above the upper-most surface and/or the bottom-most point is below the bottom-most surface.

In some examples, when the electrical box is in the second position, the electrical box extends above the roof to such an extent as to allow sideways access to one or more electrical components contained within the electrical box. This allows a maintenance person to access the electrical components within the electrical box when maintenance operations need to be performed.

In some examples, when the electrical box is in the second position, the bottom-most surface of the electrical box is substantially parallel with the roof. For example, when the electrical box is in the first position, the upper-most surface of the electrical box is above the roof, substantially parallel with the roof, or is below the roof. For example, when the electrical box is in the first position, the distance from the top-most point of the box to the plane of the roof is less than or equal to the distance from the bottom-most point of the box to the roof.

In some examples, when the electrical box is in the first position, the distance from the top-most point of the electrical box to the roof is less than 135 mm above the roof.

In some instances, it may be envisaged that the maintenance person could forget to return the electrical box to the "low height" position after inspection, which could lead to the electrical box engaging with the roof of the hoistway when the elevator car is operated normally, and therefore being damaged. This can be avoided by arranging for the electrical box to fall back down under gravity in the event of a collision with the hoistway ceiling. Thus, in some examples, the mount comprises a (e.g. resilient) locking component arranged to secure the electrical box in the second position, wherein the locking component is arranged to be overcome when a downwards force greater than the weight of the electrical box is exerted thereon, such that the electrical box is moveable from the second position to the first position. A safety margin may be included, e.g. so that a person may accidentally press on the electrical box without the locking component being overcome. For example, the locking component may be arranged to be overcome when a downwards force significantly greater than the weight of the electrical box is exerted thereon. Thus, in some examples, the locking component is arranged to be overcome when a downwards force at least 1.5 times greater than the weight of the electrical box is exerted thereon, e.g. at least 2 times greater than the weight of the electrical box, e.g. at least 3 times greater than the weight of the electrical box.

In some examples, the (e.g. resilient) locking component is a resilient member arranged such that, when a downwards force (e.g. significantly) greater than the weight of the electrical box is exerted thereon, the resilient bias of the resilient member is overcome and the electrical box is moveable from the second position to the first position. As such, the electrical box is moveable from the second position to the first position wherein the locking component can recover to its neutral position.

In some examples, the mount comprises at least one guide component arranged to guide the vertical translation of the electrical box and/or set the distance over which the electrical box may be translated. For example, the electrical box comprises a first protrusion arranged to engage with the guide component and guide the vertical translation. In some examples, the guide component comprises a guide slot arranged to receive the first protrusion on the electrical box, optionally wherein the first protrusion moves along the guide slot as the electrical box is moved between the first and second positions.

In some examples, the mount comprises two guide components arranged to be either side (e.g. on opposing sides) of the electrical box. In examples comprising a guide slot, the electrical box comprises two first protrusions on opposing sides of the electrical box, wherein each first protrusion is configured to be received within one of the two guide slots. In some examples, the first protrusion is a nut or a screw. This means that the first protrusion may be tightened against the guide slot to selectively prevent the electrical box from moving, for example when the electrical box is to be secured in the first position, so as to prevent vibrations while the elevator car is moving.

In some examples, the guide component is further arranged to set the distance over which the electrical box is vertically translated. For example, the guide component comprises a slot arranged to guide the first protrusion between a first point, at the bottom of the slot, and a second point, at the top of the slot, wherein when the first protrusion is at the first point, the electrical box is in the first position, and when the first protrusion is at the second point, the electrical box is in the second position. For example, the electrical box is secured by an interaction between the locking component and the first protrusion at the top of the guide component.

In some examples, the guide slot comprises the (e.g. resilient) locking component arranged to secure the electrical box in the second position. For example, the first (e.g. resilient) locking component is located proximate to the top of the slot to hold the first protrusion at the second point.

In some examples, the (e.g. resilient) locking component is a substantially linear protrusion extending from an edge of the guide slot in a direction parallel to the longitudinal axis of the guide slot. In some examples. the substantially linear protrusion is bulbous at the end configured to engage with the first protrusion received within the guide slot. For example, when the first protrusion is at the second point, the first (e.g. resilient) locking component is arranged to engage with the underside of the (e.g. bulbous end of the) first protrusion such that the first protrusion, and thus the electrical box, is prevented from moving vertically downwards within the guide slot and the electrical box is substantially secured in the second position.

In some examples, when a downwards force (e.g. significantly) greater than the weight of the electrical box is exerted thereon, the resilient bias of the (e.g. resilient) locking component is overcome and the electrical box is moveable from the second position to the first position.

In some examples, the locking component is arranged to elastically deform in a direction substantially perpendicular to the longitudinal axis of the guide slot when a downwards force (e.g. significantly) greater than the weight of the electrical box is exerted thereon. For example, upon the application of a downwards force to the electrical box, the first protrusion exerts a force on the (e.g. bulbous end of the) first locking component such that the first (e.g. resilient) locking component elastically deforms and the protrusion(s) are able to move vertically downwards within the slot and the electrical box is movable from the second position to the first position.

In some examples, the (e.g. resilient) locking component is made of metal, for example a deflectable strip of metal. The locking component may be made of spring steel.

In some examples, the mount comprises at least one (e.g. one, e.g. two, e.g. a plurality of) fastener(s) arranged to secure the electrical box in the first position. The fastener(s) allow the electrical box to be held in the first position against the vibrations that may occur during the normal operation of an elevator car, i.e. to prevent the electrical box from moving out of the first position due to the forces that arise in normal operation of the elevator car.

In some examples, the mount comprises a (e.g. first) fastener comprising an indentation arranged to receive a second protrusion located proximate to the top of the electrical box such that, when the electrical box is in the first position, the second protrusion holds the electrical box in the first positon under gravity. For example, the indentation is U-shaped and arranged to receive the second protrusion having a complementary shape. For example, the second protrusion(s) are nuts, e.g. butterfly nut(s), e.g. screws.

In some examples, the mount comprises a (e.g. second) fastener, arranged to secure the electrical box in the first position, wherein the (e.g. second) fastener comprises an elastic component arranged to apply a resilient bias to the first protrusion when the electrical box is in the first position.

In some examples, the guide slot comprises the elastic component. In some examples, the elastic component is a substantially linear protrusion extending from an edge of the slot in a direction parallel to the longitudinal axis of the slot in a direction towards the bottom of the slot (i.e. towards the first point of the slot). The elastic component may conveniently have substantially the same form as the resilient locking component described above.

In some examples, the mount comprises both the first and the second fasteners described above, i.e. the mount comprises an elastic component and an indentation. In some examples comprising both the first and the second fasteners, the guide component comprises the elastic component. For example, when the protrusion is fastened by the elastic component, the force exerted by the elastic component secures the electrical box in the first position and the effect of any vibration of the elevator car on the electrical box can be minimised.

In some examples, the top of the electrical box comprises a handle.

In some examples, the electrical box comprises at least one electrical connection, e.g. one or more junction(s) between two electrical harnesses. In some examples the electrical box comprises electrical components, e.g. a printed circuit board (PCB), e.g. the car operating board, e.g. a buzzer, e.g. a power supply, e.g. a circuit breaker, e.g. an Ethernet hub, e.g. a USB hub, e.g. grounding connections, or any combination thereof. In some examples, the electrical box is in communication with a car operating panel mounted within the (interior space of the) elevator car.

In some examples, the electrical box comprises a cover, wherein the cover is removable when the electrical box is in the second position.

According to a second aspect of this disclosure there is provided a mount for securing an electrical box to a sidewall of an elevator car, the mount comprising: a guide component for guiding the vertical translation of an electrical box between a first position and a second position relative to the sidewall of an elevator car.

It will be appreciated that the mount of the second aspect of this disclosure is the mount which is included in the first aspect of this disclosure.

In some examples, the mount comprises a locking component arranged to secure the electrical box in the second position, wherein the locking component is arranged to be overcome when a downwards force (e.g. significantly) greater than the weight of the electrical box is exerted thereon, such that the electrical box is moveable from the second position to the first position.

In some examples, the (e.g. resilient) locking component is a resilient member arranged such that, when a downwards force (e.g. significantly) greater than the weight of the electrical box is exerted thereon, the resilient bias of the resilient member is overcome and the electrical box is moveable from the second position to the first position. As such, the electrical box is moveable from the second position to the first position wherein the locking component can recover to its neutral position.

In some examples, the mount comprises at least one guide component arranged to guide the vertical translation of the electrical box and/or set the distance over which the electrical box may be translated. For example, wherein the electrical box comprises a first protrusion arranged to engage with the guide component and guide the vertical translation. In some examples, the guide component comprises a guide slot arranged to receive the first protrusion on the electrical box, optionally wherein the first protrusion moves within the guide slot as the electrical box is moved between the first and second positions.

In some examples, the mount comprises two guide components arranged to be either side (e.g. on opposing sides) of the electrical box and the electrical box comprises two first protrusions on opposing sides of the electrical box, wherein each first protrusion is configured to be received within one of the two guide components. In some examples, the first protrusion is a nut or a screw.

In some examples, the guide slot is further arranged to set the distance over which the electrical box is vertically translated. For example, the guide component comprises a guide slot arranged to guide the first protrusion between a first point, at the bottom of the slot, and a second point, at the top of the slot, wherein when the first protrusion is at the first point, the electrical box is in the first position, and when the first protrusion is at the second point, the electrical box is in the second position. For example, the electrical box is secured by an interaction between the locking component and the first protrusion at the top of the guide component.

In some examples, the guide slot comprises the (e.g. resilient) locking component arranged to secure the electrical box in the second position. For example, the first (e.g. resilient) locking component is located proximate to the top of the slot to hold the first protrusion at the second point.

In some examples, the (e.g. resilient) locking component is a substantially linear protrusion extending from an edge of the guide slot in a direction parallel to the longitudinal axis of the guide slot. In some examples. the substantially linear protrusion is bulbous at the end configured to engage with the first protrusion received within the guide slot. For example, when the first protrusion is at the second point, the first (e.g. resilient) locking component is arranged to engage with the underside of the (e.g. bulbous end of the) first protrusion such that the first protrusion, and thus the electrical box, is prevented from moving vertically downwards within the guide slot and the electrical box is substantially secured in the second position.

In some examples, when a downwards force (e.g. significantly) greater than the weight of the electrical box is exerted thereon, the resilient bias of the (e.g. resilient)

locking component is overcome and the electrical box is moveable from the second position to the first position.

In some examples, the locking component is arranged to elastically deform in a direction substantially perpendicular to the longitudinal axis of the guide slot when a downwards force (e.g. significantly) greater than the weight of the electrical box is exerted thereon is applied. For example, upon the application of a downwards force to the electrical box, the first protrusion exerts a force on the (e.g. bulbous end of the) first locking component such that the first (e.g. resilient) locking component elastically deforms and the protrusion(s) are able to move vertically downwards within the guide slot and the electrical box is movable from the second position to the first position.

In some examples, the (e.g. resilient) locking component is made of metal, for example a deflectable strip of metal. The locking component may be made of spring steel.

In some examples, the mount comprises at least one (e.g. one, e.g. two, e.g. a plurality of) fastener(s) arranged to secure the electrical box in the first position. The fastener(s) allow the electrical box to be held in the first position against the vibrations that may occur during the normal operation of an elevator car, i.e. it prevents the electrical box from moving out of the first position due to the forces that arise in normal operation of the elevator car.

In some examples, the mount comprises a (e.g. first) fastener comprising an indentation arranged to receive a second protrusion located proximate to the top of the electrical box such that, when the electrical box is in the first position, the second protrusion holds the electrical box in the first positon under gravity. For example, the indentation is u-shaped and arranged to receive the second protrusion having a complementary shape. For example, the second protrusion(s) are nuts, e.g. butterfly nut(s), e.g. screws.

In some examples, the mount comprises a (e.g. second) fastener, arranged to secure the electrical box in the first position, wherein the (e.g. second) fastener comprises an elastic component arranged to apply a resilient bias to the first protrusion when the electrical box is in the first position.

In some examples, the guide slot comprises the elastic component. In some examples, the elastic component is a substantially linear protrusion extending from an edge of the guide slot in a direction parallel to the longitudinal axis of the guide slot in a direction towards the bottom of the slot (i.e. towards the first point of the slot).

In some examples, the mount comprises both the first and the second fasteners described above, i.e. the mount comprises an elastic component and an indentation. In some examples comprising both the first and the second fasteners, the guide component comprises the elastic component. For example, when the protrusion is fastened by the elastic component, the force exerted by the elastic component secures the electrical box in the first position and the effect of any vibration of the elevator car on the electrical box can be minimised.

In some examples, the top of the electrical box comprises a handle.

In some examples the electrical box comprises at least one electrical connection, e.g. one or more junction(s) between two electrical harnesses. In some examples the electrical box comprises electrical components, e.g. a printed circuit board (PCB), e.g. the car operating board, e.g. a buzzer, e.g. a power supply, e.g. a circuit breaker. In some examples, the electrical box is in communication with a car operating panel mounted within the (interior space of the) elevator car.

DESCRIPTION OF FIGURES

Some examples of the present disclosure as defined by the appended claims are illustrated further by way of the following non-limiting examples and the accompanying figures, in which:

DETAILED DESCRIPTION

Figures 1A, 1B, 1C:
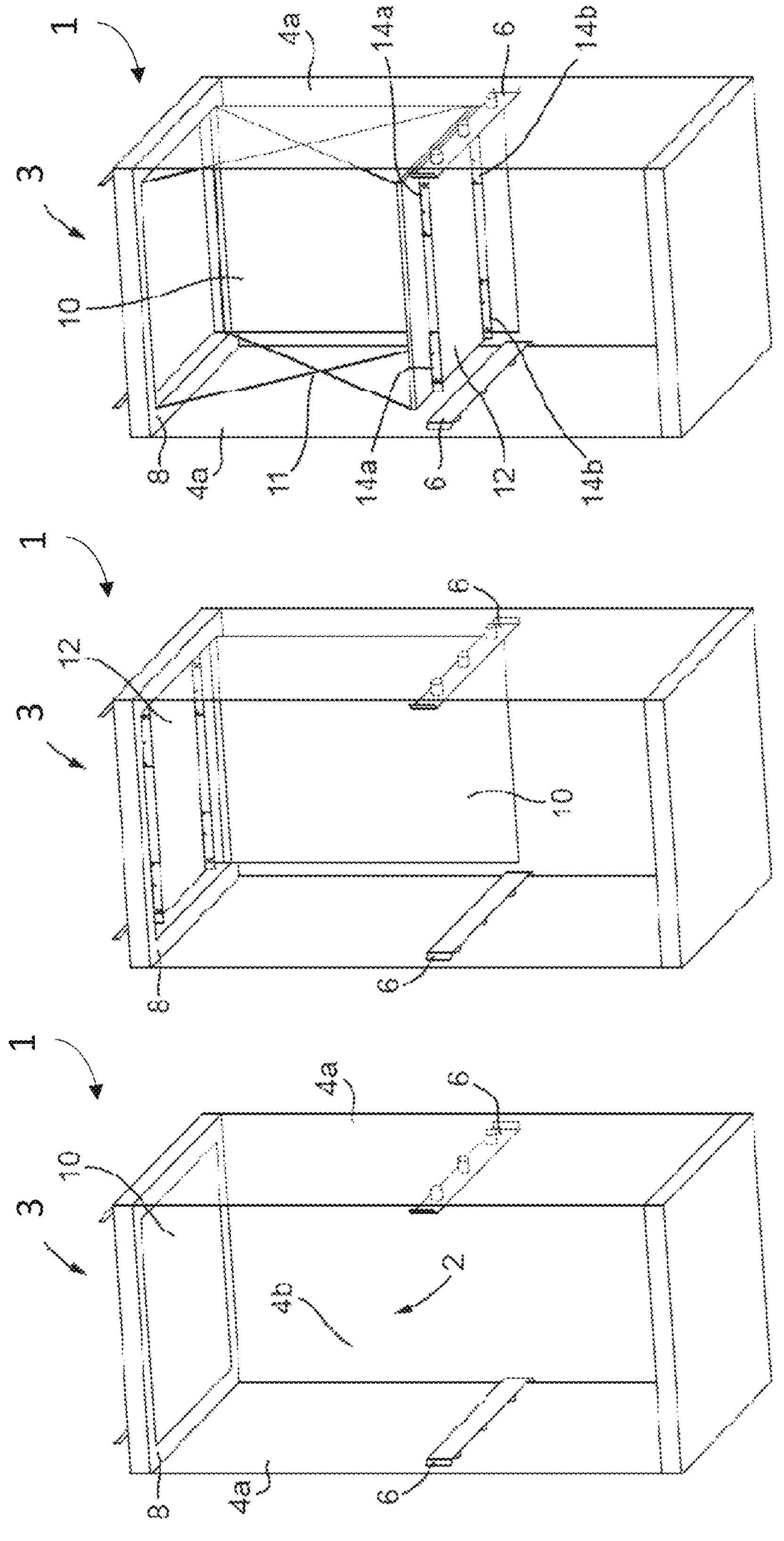
FIGS. 1*a*, 1*b* and 1*c* are cutaway schematic views of an elevator car including a working platform, moveable between a stowed position (as shown in FIGS. 1*a* and 1*b*) and an operational position (as shown in FIG. 1*c*)

FIG. 1*a* shows a view of an elevator car 1, comprising a roof 3 and side walls 4*a*, 4*b* which define an interior space 2. The elevator car 1 has two opposed side walls 4*a* to which handrails 6 are attached. The elevator car 1 additionally has two opposed side walls 4*b* (only one of which is visible in this figure), on which there are no handrails. Above the interior space 2 there is positioned a support frame 8 comprised in the roof 3, beneath which there is pivotably attached a decorative ceiling cover panel 10. In this arrangement, as shown in FIG. 1*a*, a passenger located within the interior space 2 of the elevator car 1, sees the decorative ceiling cover panel 10 as covering the vast majority, or even the entirety of the elevator car ceiling, such that the support frame 8 is not normally visible.

FIG. 1*b* shows the elevator car 1 of FIG. 1*a*, in which the decorative ceiling cover panel 10 has been pivoted down to an open position. The elements of FIG. 1*b*, which are already labelled in FIG. 1*a*, and could easily be identified as like elements by the skilled person, have not been labelled again in FIGS. 1*b* and 1*c* so as to improve the clarity of the drawings. FIG. 1*b* shows the decorative ceiling cover panel 10 as having been hinged open, from a pivot point in the elevator car ceiling, although it is equally possible that the decorative ceiling cover panel 10 could be fixed in place by any other suitable mechanism, such as for example screws or clips, and could then be removed entirely from the ceiling of the elevator car 1 in order to expose the support frame 8.

Once the cover panel 10 has been pivoted down or removed, the working platform 12 is then visible, located within the support frame 8 above the interior space 2 of the elevator car 1. In the elevator car 1 as shown in FIG. 1*b*, the working platform 12 is still in the stowed positon, but is now accessible such that a maintenance person can move the working platform 12 from the stowed position shown in FIG. 1*b*, to the operational position, as shown in FIG. 1*c*. As is most clearly seen in FIG. 1*c*, an extendable suspension mechanism 11 is arranged to suspendably connect the working platform 12 to the support frame 8. In this example, the extendable suspension mechanism 11 is a scissor mechanism. The scissor mechanism 11 opens out to allow the working platform 12 to drop down to a predetermined height in the elevator car 1 which is at substantially the same height as the handrails 6. The extendable suspension mechanism 11 can be any suitable mechanism which allows the working platform 12 to be moved between the stowed position and the operational position, and adequately supports the working platform 12 (together with any load carried in use) in its operational position.

As shown in FIG. 1*c*, the working platform 12 can be lowered from the stowed position into the interior space 2 of the elevator car 1. This lowered position of the working platform 12 is referred to herein as the operational position. It is in this operational position that a maintenance person can use the working platform 12 to stand on, and thereby access parts of the elevator system through the open ceiling for maintenance purposes. In particular, the height of the working platform 12 in the operational position is ideally at least 1.1 m below the support frame 8, such that a maintenance person standing fully upright on the working platform 12 will protrude out of an opening in the ceiling of the elevator car 1 as provided by the support frame 8. Furthermore, this means that the maintenance person has enough room below the support frame 8 to erect a safety balustrade on the working platform 12, the height of the safety balustrade being at least 1.1 m according to the European Standard EN81-1.

As best seen in FIG. 1*c*, the working platform 12 includes at least one stabilizing member 14, and in this example there are four stabilizing members 14, a first stabilizing member 14*a* and a second stabilizing member 14*b* positioned at opposed sides of the working platform 12 on the left hand side of the elevator car 1, and a first stabilizing member 14*a* and a second stabilizing member 14*b* positioned at opposed sides of the working platform 12 on the right hand side of the elevator car 1. Each of the stabilizing members 14*a*, 14*b* can be engaged with the handrails 6 on the side wall 4*a* of the elevator car 1 in order to provide lateral stability to the working platform 12.

Figure 2B:
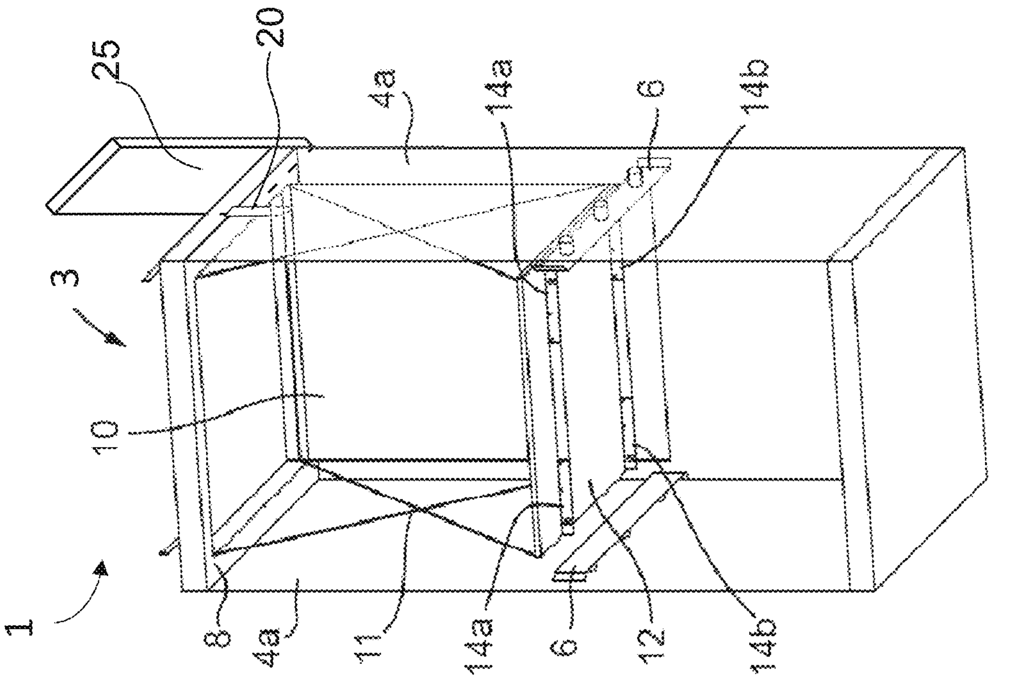
FIGS. 2*a* and 2*b* are cutaway schematic views of an elevator car including a working platform and an electrical box mounted on a sidewall of the elevator car, the electrical box moveable between a first position (as shown in FIG. 2*a*) and a second position (as shown in FIG. 2*b*)
Figure 2A:
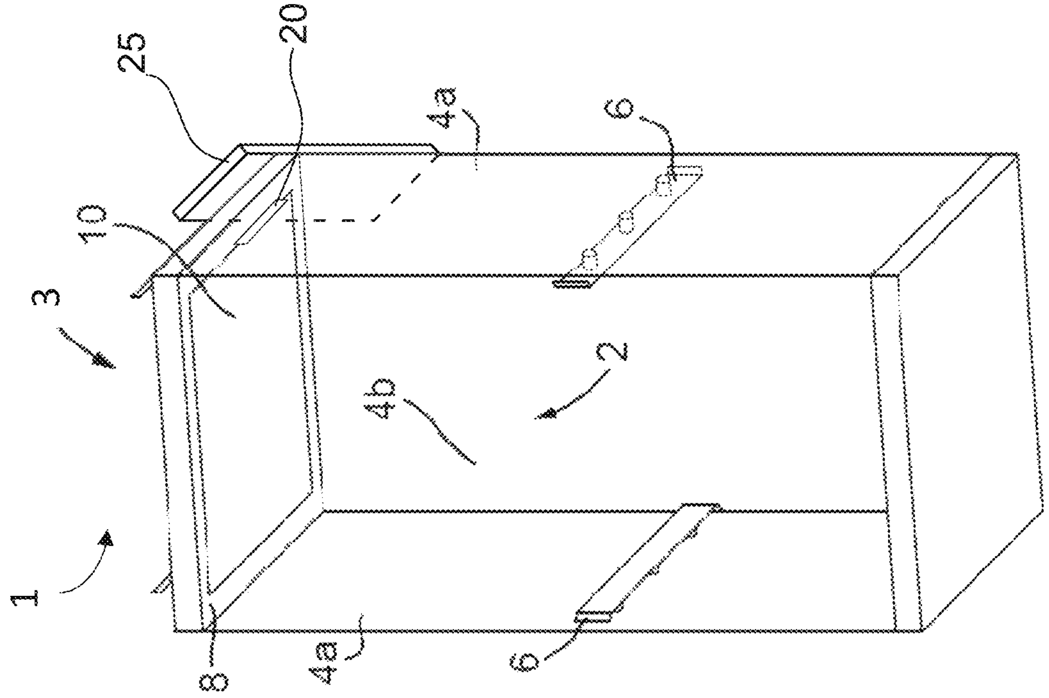

FIGS. 2*a* and 2*b* show a view of an elevator car 1 comprising an electrical box 25 mounted to a sidewall 4*a* of the one or more sidewalls 4*a*, 4*b* by a mount (not shown), wherein the mount is arranged to allow the electrical box to vertically translate between a first position (as shown in FIG. 2*a*) and a second position (as shown in FIG. 2*b*) relative to the sidewall 4*a*. The elevator car 1 further comprises a blocking component 20 configured to prevent the working platform 12 from being moved into the stowed position unless it has been released.

Figure 3:
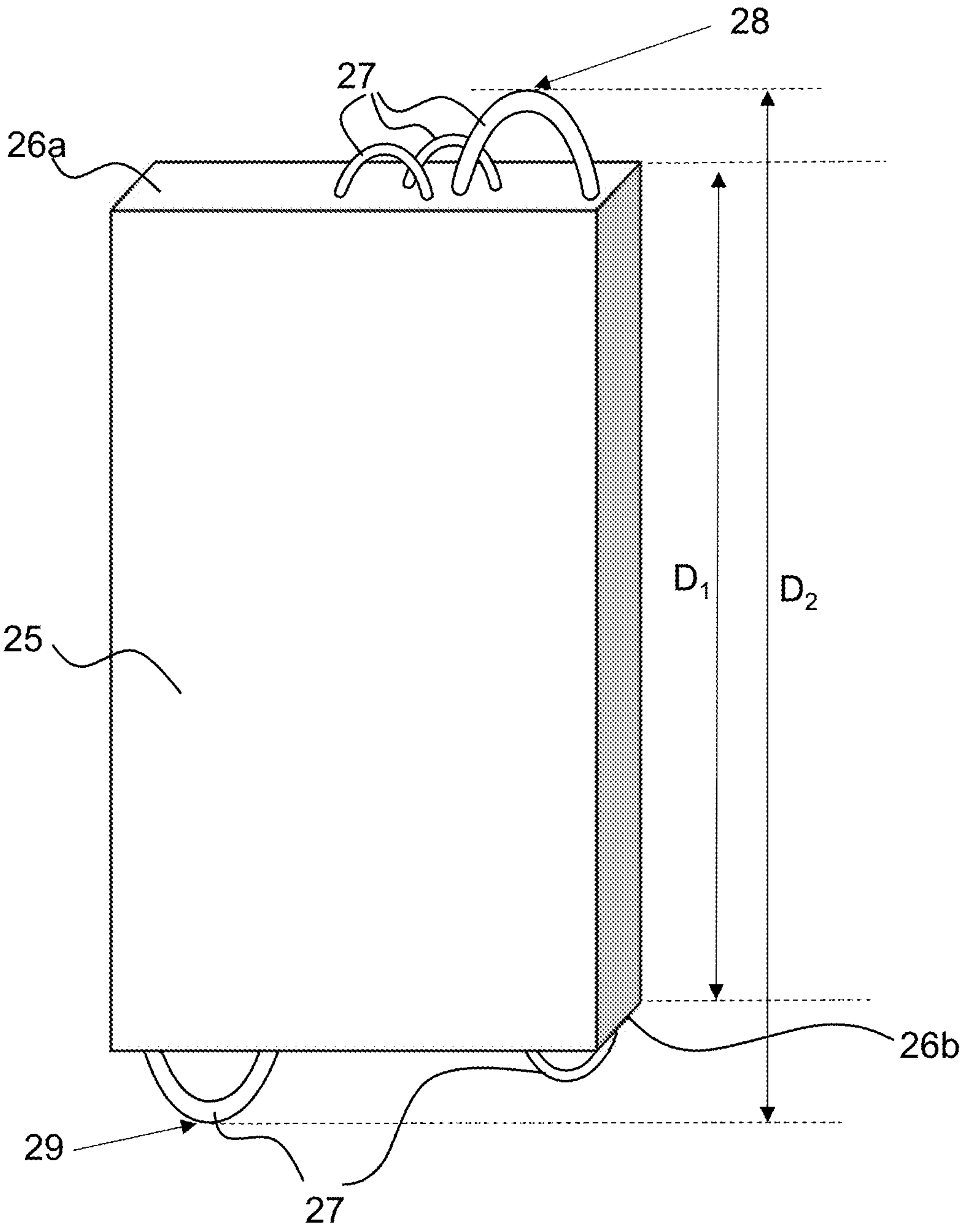
FIG. 3 shows a side view of an electrical box.

FIG. 3 shows a side view of a cuboid shaped electrical box 25 comprising an upper-most surface 26*a* and a bottom-most surface 26*b* which correspond to the top and bottom sides of a cuboid. The height of the electrical box may therefore be defined as the distance $D_1$ from the upper-most surface of the electrical box, to the bottom-most surface of the electrical box.

In some examples of the disclosure, the electrical box 25 may be a cuboid in shape (thus comprising an upper-most 26*a* and bottom-most surface 26*b*) with some components such as electrical wires 27 protruding therefrom. As such the top-most point 28 of the electrical box 25 may be above the upper-most surface 26*a* of the electrical box 25. The top-most point 28 may therefore be considered to be the part of the electrical box 25 which, if it was theoretically moved vertically upwards infinitely, would engage the ceiling of the hoistway of the elevator system first. Similarly, the bottom-most point 29 may be below the bottom-most surface 26*b* of the electrical box 25 wherein the bottom-most point 29 may be considered to be the part of the electrical box 25 which would, if it was theoretically moved vertically downwards infinitely, would engage the floor of the hoistway of the elevator system first. The distance $D_2$ from the top-most point 28 of the electrical box to the bottom-most point 29 of the electrical box defines the total height of the electrical box (i.e. the largest dimension of the electrical box).

In some examples, the top-most point 28 of the electrical box may correspond to the upper-most surface 26*a* and the bottom-most point 29 of the electrical box may correspond to be the bottom-most surface 26*b*.

Figure 4A:
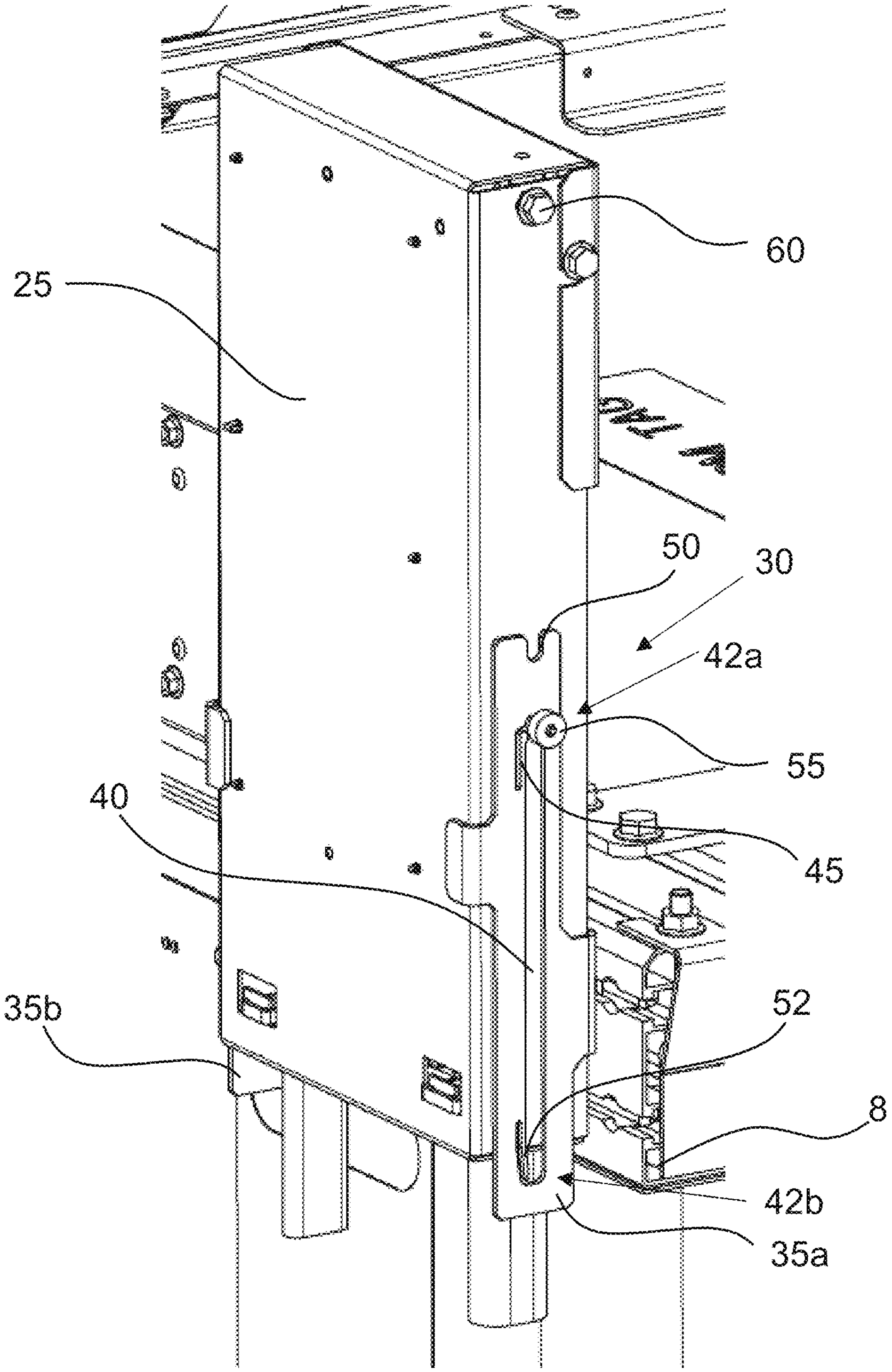
FIGS. 4*a* and 4*b* show views of an electrical box mounted on an elevator car sidewall by a mount, wherein the electrical box is secured in the second position.
Figure 4B:
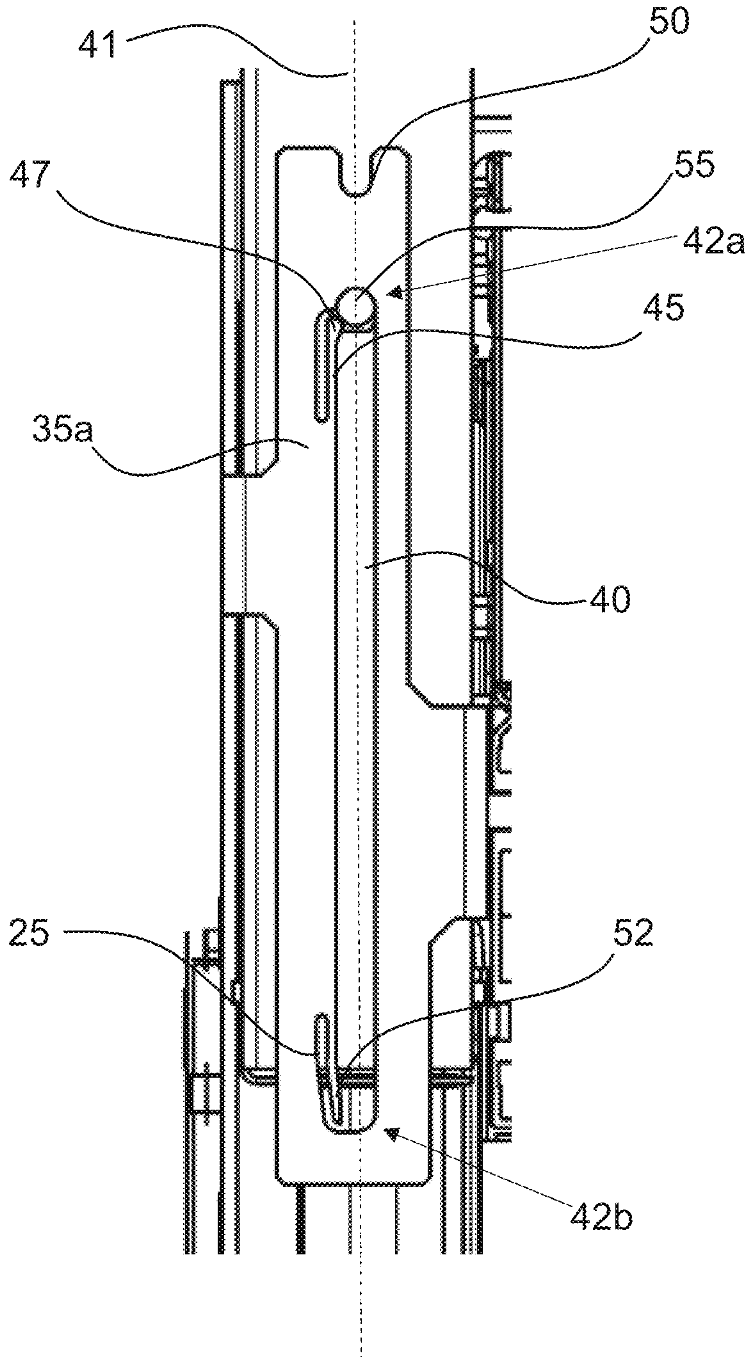

FIGS. 4*a* and 4*b* show two different views of an electrical box 25 mounted on an elevator car sidewall 4*a*, 4*b* by a mount 30, wherein the electrical box 25 is secured in the second position. The mount 30 shown comprises two guide components 35*a*, 35*b* positioned either side of the electrical box 25 and arranged to mount the electrical box 25 to the sidewall 4*a* of the elevator car. The guide components 35*a*, 35*b* each comprise a guide slot 40 and the electrical box 25 comprises two protrusions 55 (in the form of nuts or screws) on either side of the electrical box 25 such that each guide slot 40 receives one of the protrusions 55. The length of the guide slot 40 thus defines the distance over which the electrical box 25 may be vertically translated, as the guide slot 40 only allows the protrusions 55 to move between a first point 42*a*, at the top of the guide slot 40, and a second point 42*b* at the bottom of the guide slot 40.

When the protrusion 55 is at the first point 42*a* in the guide slot 40 (i.e. at the top of the guide slot 40) as shown in FIGS. 4*a* and 4*b*, the electrical box 25 is arranged to be in the second position. To hold the electrical box 25 in the second position, the guide slot 40 comprises a locking component 45. The locking component 45 shown in FIGS. 4*a* and 4*b* is a substantially linear protrusion extending from an edge of the guide slot 40 in a direction parallel to the longitudinal axis 41 (see FIG. 4*b*) of the guide slot 40. The first locking component 45 comprises a bulbous end 47 which is arranged to engage with the protrusion 55.

For example, when the electrical box 25 is moved into the second position (e.g. by a maintenance person) the protrusion 55 moves upwardly along the guide slot 40 until it engages the underside of the bulbous end 47 of the first locking component 45. At this point, further upward movement of the protrusion 55 results in deformation of the locking component 45 as the curved shape of the bulbous end 47 allows the protrusion 55 to exert a force on the locking component 45 in a direction perpendicular to the longitudinal axis 41 which in turn causes the locking component 45 to deform or bend in that perpendicular direction. As a result, the protrusion 55 is able to move past the locking component 45 to the second point 42*a* at the top of the guide slot 40.

Figure 5B:
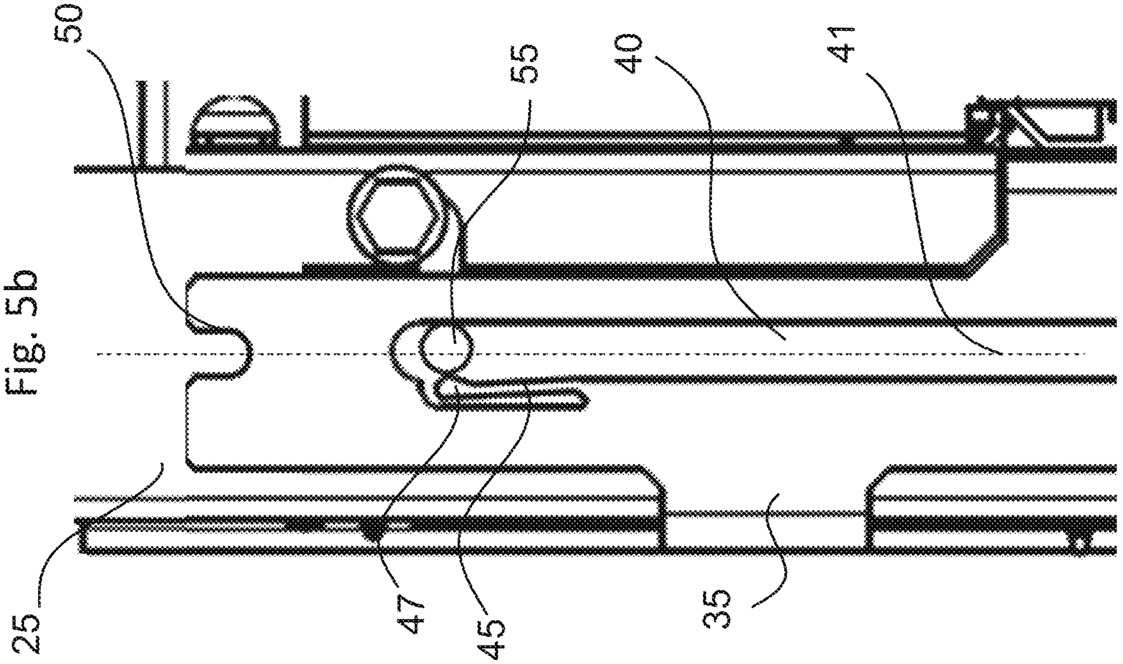
FIGS. 5*a* and 5*b* show schematics of the mount as the electrical box moves from the second position (shown in FIG. 5*a*) towards the first position (shown in FIG. 5*b*)
Figure 5A:
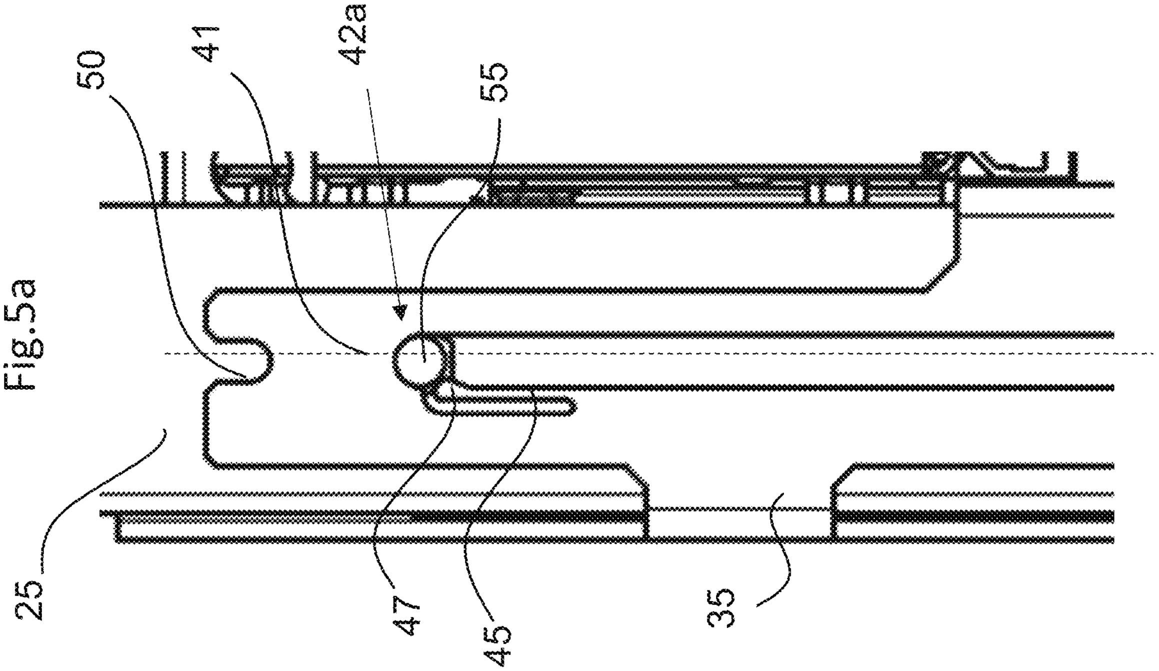

As shown in FIG. 5*a*, when the protrusion 55 is at the first point 42*a*, part of the underside of the protrusion 55 engages with the bulbous end 47 of the locking component 45 which results in holding the electrical box 25 in the second position under gravity. Once the protrusion 55 is at the first point 42*a*, the locking component 45 prevents the protrusion 55 from moving downwards within the guide slot 40 without the application of an additional force. This allows the maintenance person to access components within the electrical box 25 without having to hold the electrical box 25 in the second position. The locking component 45 thus secures the electrical box 25 in the second position with a resilient bias.

Once the maintenance person has finished accessing the components contained within the electrical box 25, the maintenance person may return the electrical box 25 to the first position by exerting a force on the top of the electrical box 25. Alternatively, if the maintenance person forgets to return the electrical box 25 to the first position and the elevator car moves upwards, the electrical box 25 in the second position may engage with the ceiling of the hoistway. In such instances, the hoistway ceiling will exert a downward force on the electrical box 25 at the point of contact.

When the downwards force exerted on the electrical box 25 (i.e. by the maintenance person or as a result of impact with the hoistway ceiling) is significantly greater than the weight of the electrical box 25, the force overcomes the resilient bias of the locking component 45, and (due to the bulbous end 47) the protrusion 55 is able to exert a force perpendicular to the longitudinal axis 41 of the guide slot 40 such that the locking component 45 is deformed in that direction and the protrusion 55 is able to move downwardly past the locking component 45 (as shown in FIG. 5*b*). As such, the electrical box 25 is moveable from the second position to the first position wherein the locking component 45 can recover to its neutral position.

Figure 6A:
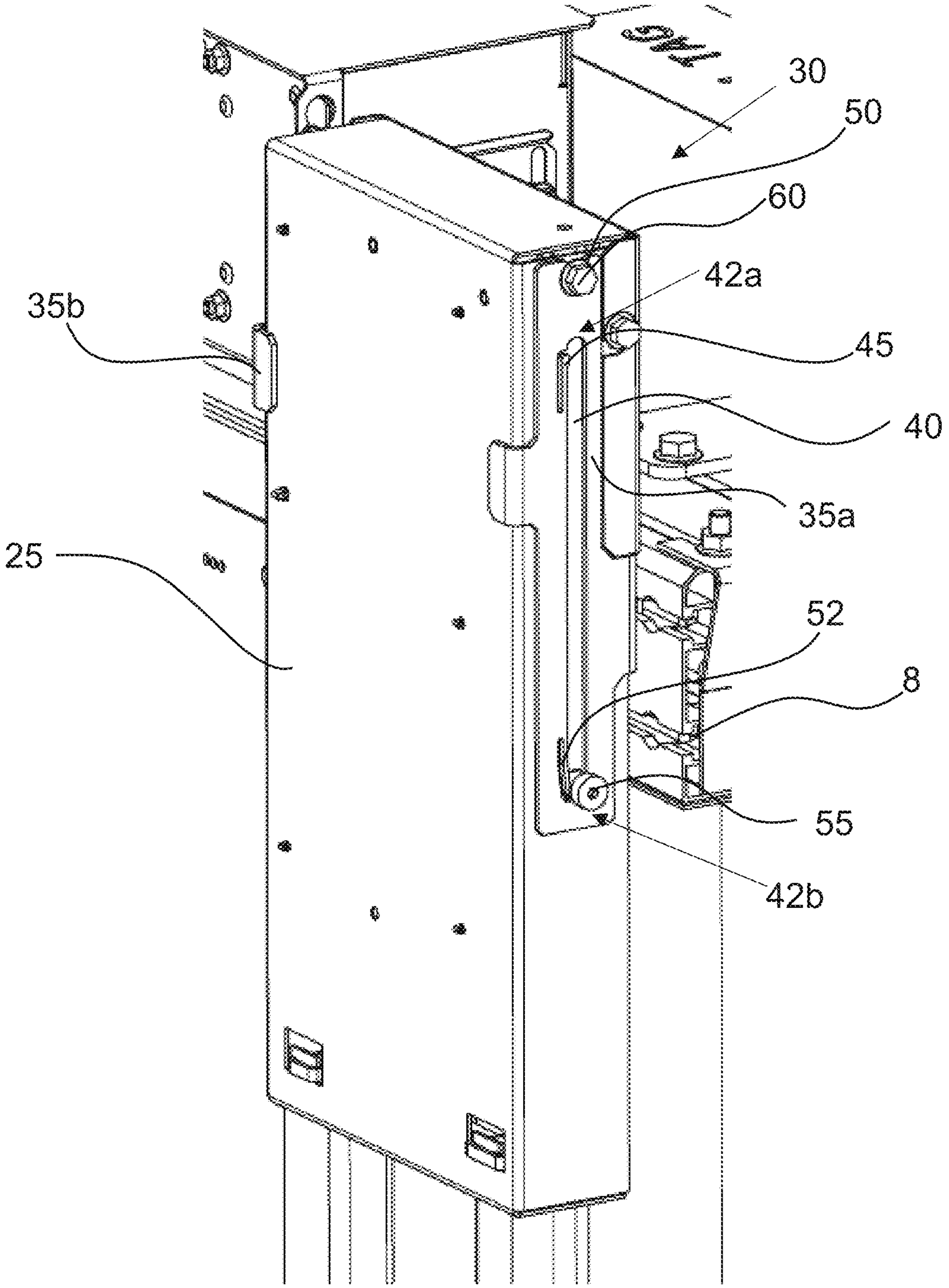
FIGS. 6*a* and 6*b* show views of an electrical box mounted on an elevator car sidewall by a mount, wherein the electrical box is secured in the first position.
Figure 6B:
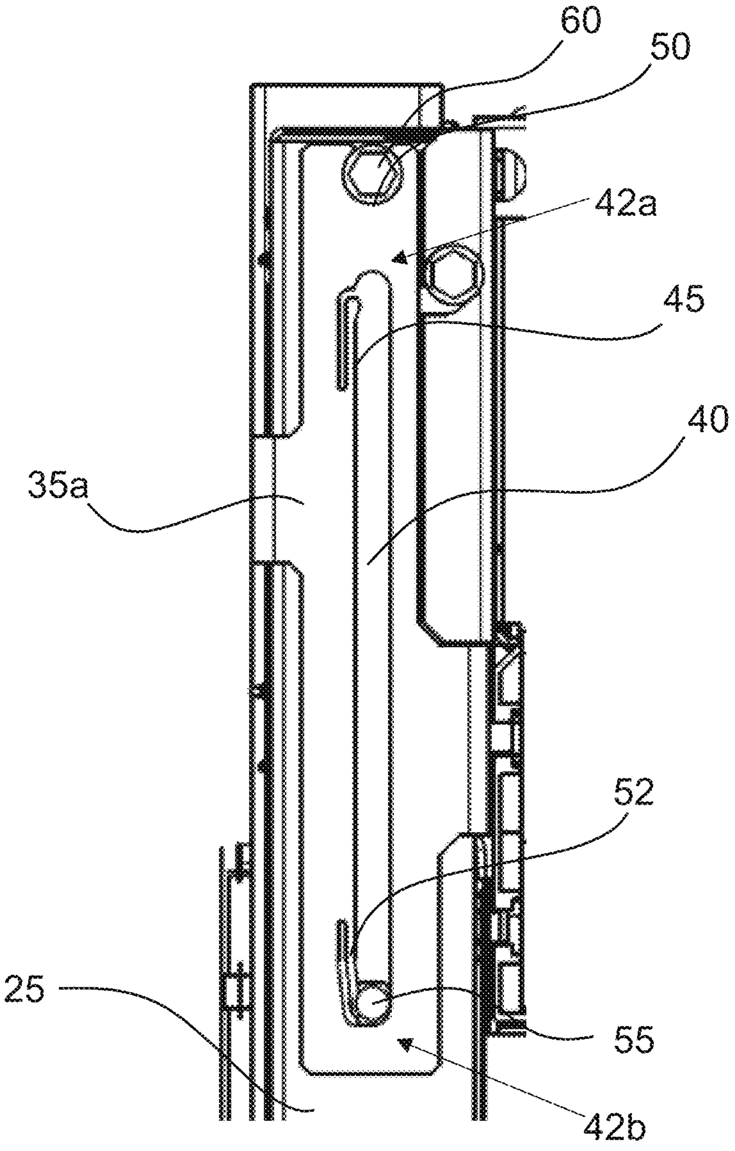

FIGS. 6*a* and 6*b* show the same two views of the electrical box 25 shown in FIGS. 4*a* and 4*b* but with the electrical box 25 secured in the first position. When the electrical box 25 is in the first position, the protrusion 55 is at the second point 42*b* in the guide slot 40 (i.e. at the bottom of the guide slot) as shown in FIGS. 6*a* and 6*b*.

To hold the electrical box 25 in the first position, the guide components 35*a*, 35*b* each further comprise a first fastener 50 (which can be seen more clearly in FIGS. 4*a*, 4*b*, 5*a* and 5*b*). As shown in FIGS. 4*a*, 4*b*, 5*a* and 5*b*, the first fastener component 50 is a U-shaped indentation which is shaped to receive a second protrusion 60 located on each side of the electrical box 25 proximate to the top of the electrical box 25. When the electrical box 25 is in the first position, the second protrusion 60 engages with the u-shaped fastener 50 to secure the electrical box 25 in the first positon under gravity. In the example shown, the second protrusion 60 is a butterfly nut and may be tightened against the u-shaped fastener 50.

Each guiding component 35*a*, 35*b* of the mount 30 further comprises a second fastener in the form of an elastic component 52 arranged to apply a resilient bias to the protrusion 55 when the electrical box is in the first position. When the protrusion 55 is at the second point 42*b* at the bottom of the guide slot 40, the force exerted by the elastic component 52 acts to secure the electrical box 25 in the first position and the effect of the vibration of the elevator car 1 on the electrical box 25 is minimised.

In the description above, it is understood that a maintenance person can conveniently stand on the working platform 12 to gain access to the electrical box 25 at least when it is raised to the second position. However, vertical translation of an electrical box 25 between two positions, as described herein, may be useful during maintenance procedures that do not involve use of such a working platform 12. For example, the elevator car 1 may alternatively have a static roof and a maintenance person standing on the roof may use the mount to vertically translate the electrical box from a first position (e.g. that is less convenient to reach) to a second position (e.g. that is more convenient to reach), or vice versa.

What is claimed is:

1. An elevator car comprising:

one or more sidewalls defining an interior space for accommodating passengers; and an electrical box mounted to a sidewall (4*a*) of the one or more sidewalls by a mount, wherein the mount is arranged to allow the electrical box to vertically translate between a first position and a second position relative to the sidewall (4*a*);

wherein the mount comprises a locking component arranged to secure the electrical box in the second position, wherein the locking component is arranged to be overcome when a downwards force greater than the weight of the electrical box is exerted thereon, such that the electrical box is moveable from the second position to the first position.

2. The elevator car of claim 1, further comprising a roof, and wherein the mount is arranged to allow the electrical box to vertically translate from the first position to a second position above the first position, wherein the electrical box at least partially extends above the roof at least in the second position.

3. The elevator car of claim 2, wherein the roof comprises a support frame and wherein a working platform is suspendably connected to the support frame and moveable between a stowed position, above the interior space, and an operational position, suspended within the interior space.

4. The elevator car of claim 2, wherein, when the electrical box is in the second position, 50% or more of the electrical box extends above the roof.

5. The elevator car of claim 2, wherein, in the second position, the electrical box extends above the roof to such an extent as to allow sideways access to one or more electrical components contained within the electrical box.

6. The elevator car of claim 2, wherein, when the electrical box is in the second position, a bottom-most surface of the electrical box is substantially parallel with the roof.

7. The elevator car of claim 2, wherein, when the electrical box is in the first position, the distance from a top-most point of the box to the roof is less than 135 mm above the roof.

8. The elevator car of claim 1, wherein the locking component is a resilient member arranged such that, when a downwards force greater than the weight of the electrical box is exerted thereon, the resilient bias of the resilient member is overcome and the electrical box is moveable from the second position to the first position.

9. The elevator car of claim 8, wherein the mount comprises at least one guide component arranged to guide the vertical translation, and optionally to set the distance over which the electrical box may be translated.

10. The elevator car of claim 9, wherein the guide component comprises a guide slot arranged to receive a first protrusion, wherein the first protrusion is located on a side of the electrical box.

11. The elevator car of claim 10, wherein the locking component is arranged to elastically deform in a direction substantially perpendicular to the longitudinal axis of the guide slot when a force greater than the weight of the electrical box is exerted thereon.

12. The elevator car of claim 9, wherein the guide component comprises the locking component arranged to secure the electrical box in the second position, optionally wherein the electrical box is secured by an interaction between the locking component and a/the first protrusion located on a side of the electrical box.

13. The elevator car of claim 1, wherein the mount further comprises at least one fastener arranged to secure the electrical box in the first position.

14. The elevator car of claim 13, wherein the at least one fastener comprises an elastic component arranged to apply a resilient bias to a/the first protrusion located on a side of the electrical box when the electrical box is in the first position.

* * * * *